(12) United States Patent
Ertas

(10) Patent No.: US 10,816,035 B2
(45) Date of Patent: Oct. 27, 2020

(54) HERMETIC SQUEEZE FILM DAMPER HAVING AN ELLIPTICAL DAMPER ORIFICE

(71) Applicant: General Electric Company, Schenectady, NY (US)

(72) Inventor: Bugra Han Ertas, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/504,241

(22) Filed: Jul. 6, 2019

(65) Prior Publication Data

US 2020/0191200 A1    Jun. 18, 2020

Related U.S. Application Data

(60) Provisional application No. 62/780,943, filed on Dec. 18, 2018.

(51) Int. Cl.
*F16C 32/06* (2006.01)
*F16F 15/023* (2006.01)
(Continued)

(52) U.S. Cl.
CPC .......... *F16C 32/0607* (2013.01); *F01D 25/06* (2013.01); *F01D 25/16* (2013.01);
(Continued)

(58) Field of Classification Search
CPC ........ F01D 25/06; F01D 25/04; F01D 25/162; F01D 25/164; F16F 15/0237;
(Continued)

(56) References Cited

U.S. PATENT DOCUMENTS

| 4,638,895 A | 1/1987 | Taylor et al. |
| 4,768,627 A | 9/1988 | Taylor |

(Continued)

FOREIGN PATENT DOCUMENTS

| EP | 0497259 A1 * | 8/1992 | ............... B64G 1/22 |
| JP | H07119743 A | 5/1995 | |

(Continued)

OTHER PUBLICATIONS

E. J. Gunter et al., "Stabilization of Turbomachinery with Squeeze Film Dampers—Theory and Applications", pp. 1-10, Jun. 18, 1976.

(Continued)

*Primary Examiner* — Marcus Charles
(74) *Attorney, Agent, or Firm* — Paul Diconza

(57) ABSTRACT

Embodiments of a damper assembly are disclosed. In some embodiments, the damper assembly includes a damper housing, a damper plunger and a support spring. The damper plunger is disposed at least partially within the housing and movable within to define a first primary damper cavity and a second primary damper cavity. A damper cavity restrictive clearance is defined between the first primary damper cavity and the second primary damper cavity. The damper cavity restrictive clearance includes an elliptical damper orifice having a major-axis and a minor-axis at a mid-plane of the damper cavity restrictive clearance and is oriented perpendicular to a direction of a vibrational force imposed on the damper assembly.

20 Claims, 5 Drawing Sheets

(51) Int. Cl.
*F01D 25/16* (2006.01)
*F01D 25/06* (2006.01)

(52) U.S. Cl.
CPC ...... *F16F 15/0237* (2013.01); *F05D 2220/30* (2013.01); *F05D 2240/50* (2013.01); *F05D 2260/96* (2013.01); *F16C 2360/23* (2013.01); *F16F 2222/12* (2013.01)

(58) Field of Classification Search
CPC . F16F 2222/12; F16C 2360/23; F16C 17/035; F16C 32/0607; F16C 32/604; F05D 2220/30; F05D 2240/50; F05D 2260/96; B64G 2001/228
USPC ............ 384/99, 103, 109, 114, 627; 138/30; 264/113, 118, 140.11
See application file for complete search history.

(56) References Cited

U.S. PATENT DOCUMENTS

| | | | | |
|---|---|---|---|---|
| 5,249,783 | A | * | 10/1993 | Davis ................. B64G 1/22 188/298 |
| 5,380,100 | A | * | 1/1995 | Yu ................. F16F 15/0237 267/113 |
| 5,487,454 | A | | 1/1996 | Klembczyk et al. |
| 5,501,531 | A | * | 3/1996 | Hamaekers ............ B60K 17/24 384/536 |
| 6,082,508 | A | * | 7/2000 | Davis ................. F16F 9/0472 188/298 |
| 6,216,831 | B1 | | 4/2001 | Taylor |
| 6,345,707 | B1 | | 2/2002 | Klembczyk |
| 6,938,888 | B2 | | 9/2005 | Levallard et al. |
| 7,374,342 | B2 | | 5/2008 | Yum et al. |
| 7,492,069 | B2 | | 2/2009 | Knox et al. |
| 7,625,121 | B2 | | 12/2009 | Pettinato et al. |
| 7,870,871 | B1 | * | 1/2011 | Hanjagi ................. F02M 55/04 138/30 |
| 9,121,448 | B2 | | 9/2015 | Delgado Marquez et al. |
| 9,416,820 | B2 | | 8/2016 | Ertas et al. |
| 9,429,191 | B2 | | 8/2016 | Ertas et al. |
| 9,745,992 | B2 | | 8/2017 | Barber et al. |
| 9,746,029 | B1 | | 8/2017 | Mook et al. |
| 9,841,077 | B2 | * | 12/2017 | Modrezejewski .... B64C 27/001 |
| 10,024,382 | B2 | | 7/2018 | Yao |
| 10,036,279 | B2 | * | 7/2018 | Ertas ................. F16C 32/0666 |
| 10,001,166 | B2 | | 9/2018 | Ertas et al. |
| 10,066,505 | B2 | | 9/2018 | Ertas et al. |
| 2002/0005607 | A1 | * | 1/2002 | Muramatsu ........... F16F 13/106 267/140.11 |
| 2003/0202726 | A1 | * | 10/2003 | Robb ................. F16C 27/045 384/536 |
| 2015/0345585 | A1 | * | 12/2015 | Gaudet ................. F41C 23/08 42/74 |
| 2019/0032477 | A1 | | 1/2019 | Huang |

FOREIGN PATENT DOCUMENTS

| | | | | |
|---|---|---|---|---|
| JP | 08334140 | A | * 12/1996 | ............. F16F 15/04 |
| JP | 2006226462 | A | 8/2006 | |
| JP | 2007113708 | A | 5/2007 | |
| JP | 2010031989 | A | * 2/2010 | ............. F16F 13/18 |
| JP | 2013067133 | A | * 4/2013 | ............. B41J 2/06 |
| JP | 5276414 | B2 | 8/2013 | |

OTHER PUBLICATIONS

Jianming Cao et al., "Nonlinear Modeling of Tilting-pad Bearings with Squeeze Film Dampers and Application to Flexible Rotor Analysis", Journal of Engineering Research and Application, vol. 7, Issue: 10, pp. 51-68, Oct. 2017.

Bugra Ertas et al., "Hermetically Sealed Squeeze Film Damper for Operation in Oil-free Environments", Journal of Engineering for Gas Turbines and Power, vol. 141, Issue: 2, pp. 1-9, Oct. 15, 2018.

Seshagiri Sanjeev, "Identification of Force Coefficients in Two Squeeze Film Dampers with a Central Groove", Texas A&M University Libraries, pp. 1-81, Jul. 16, 2012.

Creci et al., "Influence of the Radial Clearance of a Squeeze Film Damper on the Vibratory Behavior of a Single Spool Gas Turbine Designed for Unmanned Aerial Vehicle Applications", Shock and Vibration, vol. 2017, pp. 1-13, Feb. 19, 2017.

Delgado et al., "Dynamic Characterization of a Novel Externally Pressurized Compliantly Damped Gas-Lubricated Searing With Hermetically Sealed Squeeze Film Damper Modules", Journal of Engineering for Gas Turbines and Power, vol. 141, Issue: 2, pp. 1-10, Oct. 16, 2018.

* cited by examiner

HERMETIC SQUEEZE FILM DAMPER HAVING AN ELLIPTICAL DAMPER ORIFICE

BACKGROUND

The field of the disclosure relates generally to gas bearing assemblies, and more particularly, to gas bearings including hermetic squeeze film dampers.

Conventional turbomachines possess rotor assemblies that include shafts, compressor impellers, turbines, couplings, sealing packs and other elements required for optimal operation under given operating conditions. These rotor assemblies have a mass generating a constant static force due to gravity, and also generate a dynamic force due to imbalances in the rotor assembly during operation. Other static forces can be generated from geared turbomachinery. Such turbomachines include bearings to sustain and support these forces while permitting rotation of the rotor assembly.

At least some known rotary machines use gas bearings where a non-oil lubricated bearing is desired. A typical non-oil lubricated bearing, and more specifically, a gas bearing includes a bearing support including hermetic squeeze film dampers (HSFD). More specifically, the HSFDs are intended to work in an air bearing system damping vibrations and enabling stable operation of the rotor system at high speeds.

A typical additively built gas bearing with HSFD possesses a pad central post that creates an annular restrictive clearance with a hair-pin support structure. For the HSFD to work properly the clearance must be controlled to a high precision. Typically, known additive manufacturing methods (DLMS) are employed on state of the art gas bearings using HSFD. During additive manufacturing, the restrictive clearance can become difficult to control using conventional circular geometry clearances.

Therefore, the inventors have provided an improved gas bearing including a novel HSFD.

BRIEF DESCRIPTION

Aspects and advantages of the disclosure are set forth below in the following description, or may be obvious from the description, or may be learned through practice of the disclosure.

In one aspect, a HSFD damper assembly of a gas bearing is provided. The damper assembly includes a damper housing, a damper plunger disposed at least partially within the housing and a damper cavity restrictive clearance defined between the first primary damper cavity and the second primary damper cavity. The damper plunger is movable within the housing to define a first primary damper cavity and a second primary damper cavity. The damper cavity restrictive clearance includes an elliptical damper orifice having a major-axis and a minor-axis at a mid-plane of the damper cavity restrictive clearance. The damper orifice is oriented perpendicular to a direction of a vibrational force imposed on the damper assembly.

In another aspect, a gas bearing is provided. The gas bearing includes an outer rim, a housing and a damper assembly. The damper assembly including a damper housing and a damper plunger disposed at least partially within the housing. The damper plunger is movable within the housing to define a first primary damper cavity and a second primary damper cavity. The damper assembly further includes a damper cavity restrictive clearance defined between the first primary damper cavity and the second primary damper cavity. The damper cavity restrictive clearance includes an elliptical damper orifice, having a major-axis and a minor-axis at a mid-plane of the damper cavity restrictive clearance, oriented perpendicular to a direction of a vibrational force imposed on the damper assembly.

In yet another aspect, a gas bearing is provided. The gas bearing includes an outer rim, a housing and a damper assembly. The damper assembly includes a damper housing and a damper plunger disposed at least partially within the housing. The damper plunger is movable within the housing to define a first primary damper cavity and a second primary damper cavity. The damper assembly further includes a damper cavity restrictive clearance defined between the first primary damper cavity and the second primary damper cavity. The damper cavity restrictive clearance includes an elliptical damper orifice, having a major-axis and a minor-axis at a mid-plane of the damper cavity restrictive clearance, oriented perpendicular to a direction of a vibrational force imposed on the damper assembly, wherein a 45-degree tangency line of the primary damper cavity restrictive clearance is formed at a top-center of the elliptical damper orifice.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present disclosure, including the best mode thereof to one skilled in the art, is set forth more particularly in the remainder of the specification, including reference to the accompanying figures, in which.

Figure 1:
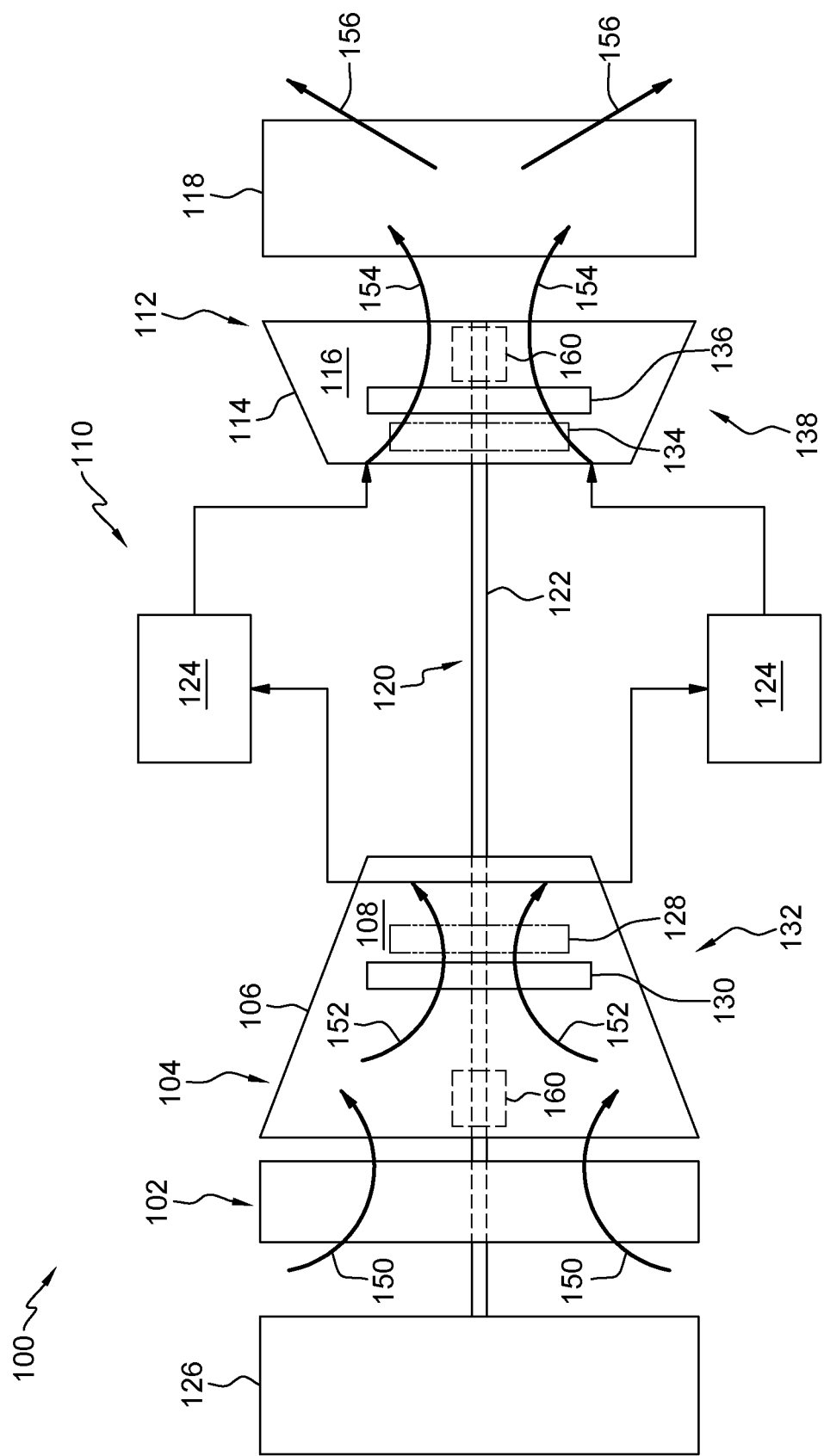
FIG. 1 is a schematic view of a rotary machine including a gas bearing and HSFD, in accordance with one or more embodiments of the present disclosure.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein. Corresponding reference characters indicate corresponding parts throughout the several views of the drawings.

DETAILED DESCRIPTION OF THE DISCLOSURE

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Embodiments of the present disclosure provide for a bearing including a plurality of HSFD assemblies, also referred to herein as bearing supports, having an elliptical damper orifice, as compared to conventional HSFD having a circular revolved orifice configuration. In at least some embodiments, the inventive bearing provides a high-performance fluid damper assembly with a hydrostatically pressurized compliant bearing pad. Moreover, the damper assemblies include a HSFD that possesses a first, or upper, primary damper cavity and second, or lower, primary damper cavity, and an elliptical center-post orifice design.

Each example is provided by way of explanation of the disclosure, not limitation of the disclosure. In fact, it will be apparent to those skilled in the art that modifications and variations can be made in the present disclosure without departing from the scope or spirit thereof. For instance, features illustrated or described as part of one embodiment may be used on another embodiment to yield a still further embodiment. Thus, it is intended that the present disclosure covers such modifications and variations as come within the scope of the appended claims and their equivalents.

To create the complex geometries of the bearings and maintain a cost-effective part requires the use of additive manufacturing. The inventors have observed that additively manufactured damper assemblies in conventional gas bearings, typically possess dimensional resolution and limitations on overhanging build structures, resulting in difficulties in controlling the critical orifice clearances of the assembly. However, when considering the limitations of additive manufacturing, in regard to dimensional resolution and limitations on overhanging build structures, controlling the critical orifice clearance becomes challenging. When considering a typical circular damper orifice geometry, once the build layers reach a 45-degree tangency line, the build quality is severely compromised resulting in "stalactite" formations due to unsupported build layers. Considering that this low-resolution region is ~90 degrees in angular span, the restrictive clearance of the damper varies a large amount therefore impeding the full performance of the system.

Accordingly, disclosed is a HSFD architecture that uses an elliptical damper orifice at a restrictive clearance between fluid cavities to yield a novel damper design for a bearing. It is noted that although a HSFD damper assembly including a single restrictive clearance is described herein, the disclosed novel elliptical damper orifice is applicable to a HSFD including any number of restrictive clearances, such as disclosed in the applicant's commonly assigned, U.S. Non-Provisional application, filed simultaneously herewith, by B. Ertas, entitled, "BEARING SUPPORT INCLUDING HERMETIC SQUEEZE FILM DAMPER AND ACCUMULATOR VOLUME".

The HSFD uses a series of fluidic cavities connected through the carefully controlled restrictive clearances, where the cavity volumes are modulated through externally imposed vibratory motion. The vibratory motion creates a recirculating fluid flow through the cavities and restrictions to generate robust levels of viscous damping. To provide such, the design provides an elliptical orifice design that, for additive manufacturing purposes, moves the 45-degree tangency line farther up the restrictive clearance towards a top-center, therefore reducing the angular span where the build quality is compromised. This unique configuration yields an HSFD that is manufacturable by additive manufacturing techniques to include a controlled critical orifice.

Referring now to FIG. 1, illustrated is a schematic view of a rotary machine, i.e., a turbomachine 100, and more specifically, a non-oil lubricated turbine engine. In the exemplary embodiment, the turbine engine is a gas turbine engine. Alternatively, the turbomachine 100 is any other turbine engine and/or turbomachine, including, without limitation, a steam turbine engine, a centrifugal compressor, and a turbocharger. In the exemplary embodiment, the turbomachine 100 includes an air intake section 102, and a compressor section 104 that is coupled downstream from, and in flow communication with, the intake section 102. The compressor section 104 is enclosed within a compressor casing 106 defining a compressor chamber 108. A combustor section 110 is coupled downstream from, and in flow communication with, the compressor section 104, and a turbine section 112 is coupled downstream from, and in flow communication with, the combustor section 110. The turbine section 112 is enclosed within a turbine casing 114 defining a turbine chamber 116. An exhaust section 118 is provided downstream from the turbine section 112. Moreover, in the exemplary embodiment, the turbine section 112 is coupled to the compressor section 104 via a rotor assembly 120 including a drive shaft 122. The drive shaft 122 is rotationally supported by one or more bearing assemblies, for example, gas bearing or journal bearing assemblies (shown at multiple positions in accordance with one or more embodiments at 160) located within the compressor casing 106 and the turbine casing 114.

In the exemplary embodiment, the combustor section 110 includes a plurality of combustor assemblies, i.e., the combustors 124 that are each coupled in flow communication with the compressor section 104. Moreover, in the exemplary embodiment, the turbine section 112 and the compressor section 104 are rotatably coupled to a load 126 via the drive shaft 122. For example, the load 126 may include, without limitation, an electrical generator and/or a mechanical drive application, e.g., a pump, a propeller, fan, rotor, or the like. In some embodiments, the turbomachine 100 may be an aircraft engine.

Also, in the exemplary embodiment, the compressor section 104 includes at least one compressor blade assembly 128 and at least one optional adjacent stationary vane assembly 130. Each combination of the compressor blade assembly 128 and adjacent stationary vane assembly defines a compressor stage 132. Also, each compressor blade assembly 128 includes a plurality of compressor blades (not shown in FIG. 1) and each stationary vane assembly 130 includes a plurality of compressor vanes (not shown in FIG. 1). Furthermore, each compressor blade assembly 128 is removably coupled to the drive shaft 122 and each stationary vane assembly 130 is removably coupled to, and supported by, the compressor casing 106.

Further, in the exemplary embodiment, the turbine section 112 includes at least one turbine blade assembly 134 and at least one adjacent stationary nozzle assembly 136. Each combination of turbine blade assembly 134 and adjacent stationary nozzle assembly 136 defines a turbine stage 138. Also, each turbine blade assembly 134 is removably coupled to the drive shaft 122 and each stationary nozzle assembly 136 is removably coupled to, and supported by, the turbine casing 114.

Figure 2:
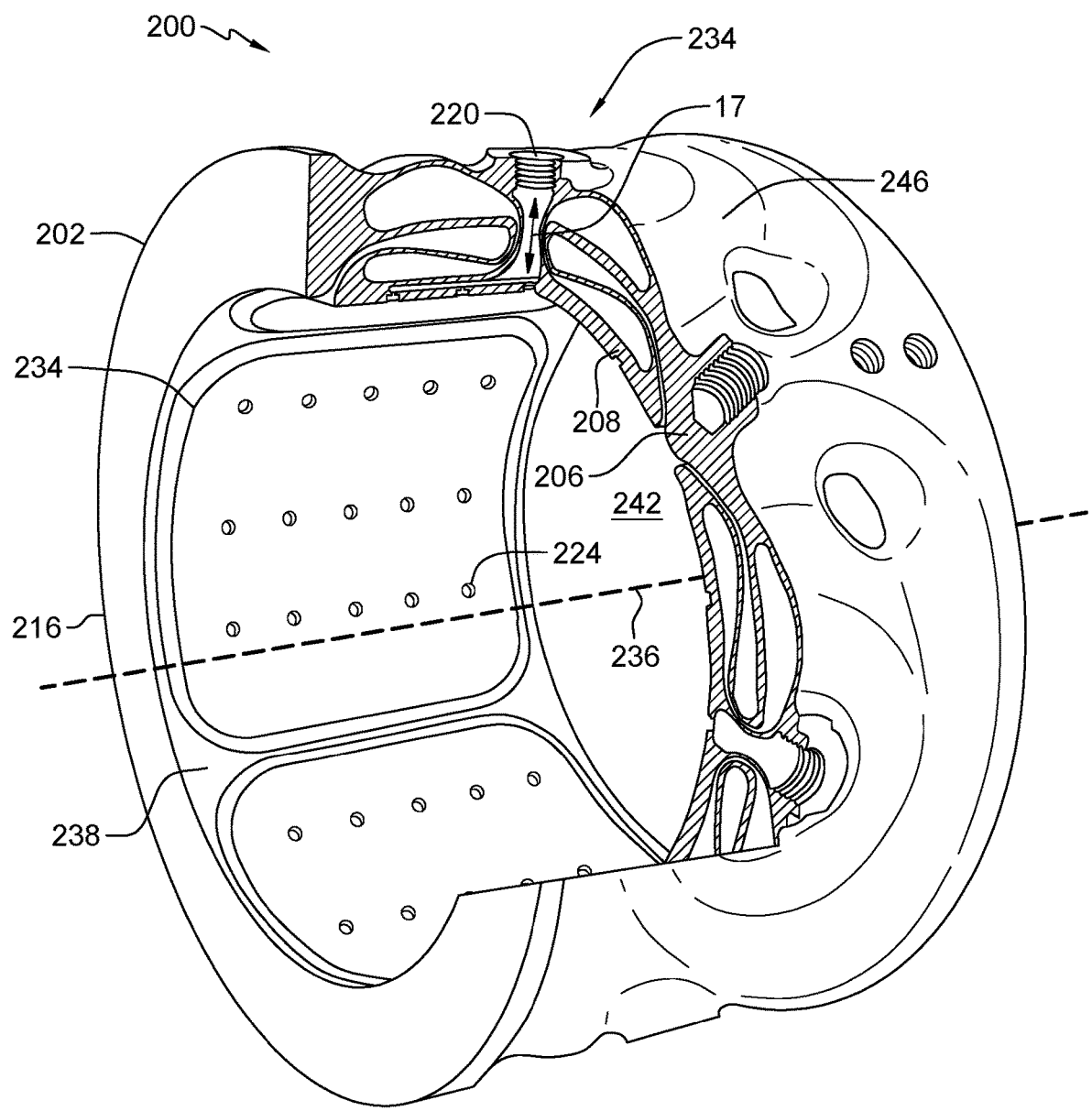
FIG. 2 is a schematic cut-away isometric view of an embodiment of the gas bearing of FIG. 1, including a HSFD, in accordance with one or more embodiments of the present disclosure.

In operation, the air intake section 102 channels air 150 towards the compressor section 104. The compressor section 104 compresses the inlet air 150 to higher pressures and temperatures prior to discharging a compressed air 152 towards the combustor section 110. The compressed air 152 is channeled to a fuel nozzle assembly (not shown), mixed with fuel (not shown), and burned within each combustor 124 to generate combustion gases 154 that are channeled downstream towards the turbine section 112. The combustion gases 154 generated within the combustors 124 are channeled downstream towards the turbine section 112. After impinging the turbine blade assembly 134, thermal energy is converted to mechanical rotational energy that is used to the drive rotor assembly 120. The turbine section 112 drives the compressor section 104 and/or the load 126 via the drive shaft 122, and exhaust gases 156 are discharged through the exhaust section 118 to ambient atmosphere. The bearing assemblies 160 facilitate rotation of the rotor assembly 120 and dampen vibrational energy imparted to the bearing assemblies 160 during operation of the turbomachine 100. Although the bearing assemblies 160 are described and illustrated as being located within the compressor casing 106 and the turbine casing 114, the bearing assemblies 160 may be located at any desired location along the shaft 122 including, but not limited to, a central or mid-span region of the shaft 122, or other locations along the shaft 122 where the use of conventional bearing assemblies would present significant design challenges Referring now to FIG. 2, illustrated is schematic cut-away isometric view of an embodiment of a gas bearing 200 of a rotary machine, including a HSFD assembly, in accordance with one or more embodiments of the present disclosure. The gas bearing 200 is generally similar to the gas bearing 160, of the rotary machine 100 of FIG. 1. In some embodiments, the bearing 200 may generally comprise an outer rim 202, a housing 216, a plurality of bearing pads 208 and a plurality of HSFD damper assemblies, in accordance with embodiments disclosed herein, (indicated generally at 234 of FIG. 2).

The bearing pads 208 are symmetrically arranged about a central axis 236 of the bearing assembly 200 and define an annular inner surface 238 that is configured to support a rotatable shaft (e.g. shaft 122 of FIG. 1). In some embodiments, each bearing pad 208 is adapted to receive a working gas (e.g., air, compressed air and combustion gases, or the like) from a gas inlet 220, and disperse and/or diffuse the gas to support and/or lubricate the shaft during operation of the turbomachine, thereby providing a hydrostatically pressurized compliant bearing pad 208. For example, in some embodiments, each bearing pad 208 has a sufficiently high gas permeability to permit the gas received via the gas inlet (not shown) to generate sufficient pressure within an interior cavity 242 to provide the support and/or lubrication of the shaft 122. Alternatively, or in combination, in some embodiments, the bearing pad 208 may include a plurality of gas distribution holes 224 disposed across the bearing pad 208 to provide an evenly distributed pressure field within the interior cavity 242 for supporting and/or lubricating the shaft. In such embodiments, the plurality of gas distribution holes 224 may be fluidly coupled to one or more plenums (not shown) to facilitate even distribution of the gas. In embodiments where the one or more plenums are present, a bearing pad sealing plate (not shown) may be coupled to the bearing pad 208 to seal the one or more plenums.

The plurality of gas distribution holes 224 may be configured having any dimensions or arrangements (e.g., array, pattern or configuration) suitable to function as described herein. For example, in some embodiments, the plurality of gas distribution holes 224 may generally have a diameter in the range of between about 2 mils (about 50 micrometers) and about 100 mils (about 2,540 micrometers) and, more specifically, between about 5 mils (about 127 micrometers) and about 20 mils (about 508 micrometers).

The bearing pads 208 may be fabricated from any material suitable to withstand the working conditions of the bearing assembly 200. In addition, in some embodiments, the bearing pad 208 is fabricated from a material having a sufficiently low porosity to prevent instabilities in the thin gas film created between bearing pads 208 and shaft during operation of the turbomachine. For example, in some embodiments, the bearing pads 208 may be fabricated from porous carbons, such as carbon graphite, sintered porous ceramics, and sintered porous metals, such as Inconel® and stainless steel.

Figure 3:
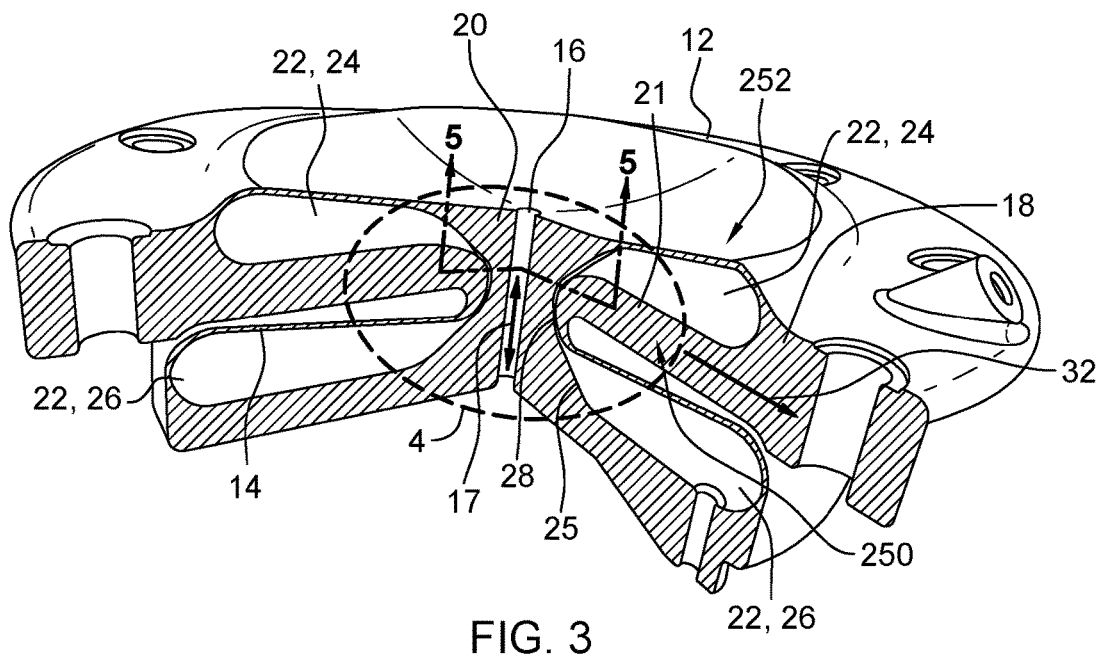
FIG. 3 is a partial isometric cross-section of an embodiment of the HSFD of FIG. 2, in accordance with one or more embodiments of the present disclosure.
Figure 4:
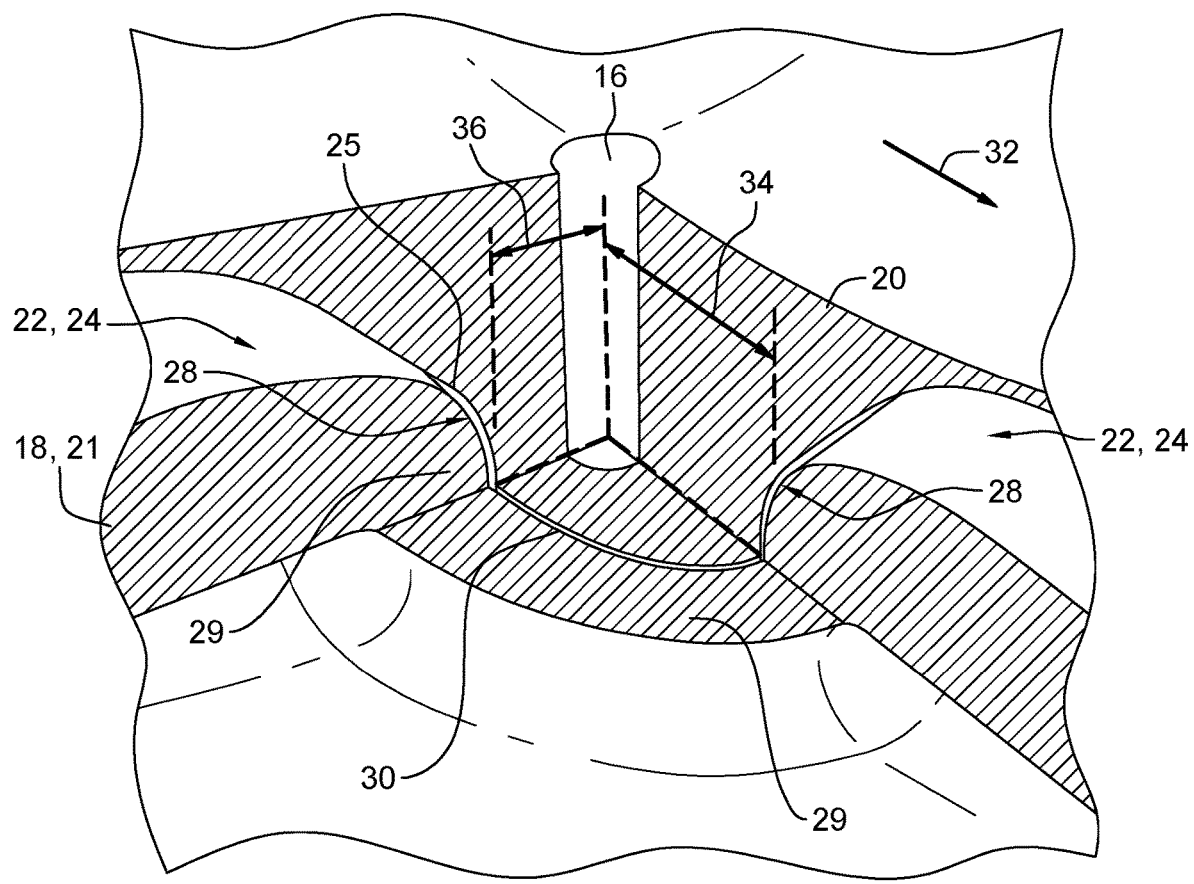
FIG. 4 is an enlargement of a portion of the HSFD of FIG. 3, indicated by dotted line 4 of FIG. 3, in accordance with one or more embodiments of the present disclosure.

Referring more specifically to FIGS. 3 and 4, a portion of the HSFD assembly 234 of FIG. 2 is illustrated. The HSFD assembly 234 generally comprises a damper 250 and a support spring 252 manufactured using well-known additive manufacturing techniques. In the illustrated embodiment, the HSFD assembly 234 includes a stationary annular damper housing 12. The stationary annular damper housing 12 provides support to a plurality of flexible elements 14 and is the structure that reacts to damping and stiffness forces generated in the damper support, and more particularly, the stationary damper housing 12. As best illustrated in FIG. 3, the flexible elements 14 may be disposed substantially parallel to a central post 16. The moving central post 16 transmits an externally imposed vibration to a damper plunger 18, which then modulates a plurality of cavity volumes (described presently) within the HSFD assembly 234. It should be noted that varying plunger designs may be utilized in the damper assembly.

In the illustrated embodiment, the damper plunger 18 is defined by stiff/rigid walls (thick arms) referred to herein as a damper platform 20 defining two opposing primary damper cavities 22, and a plunger platform 21, extending into the primary damper cavity 22. The damper platform 20 is designed to not deflect during operation.

The damper plunger 18 is disposed within a cavity 246 (FIG. 2) formed within the housing 216 and coupled to the housing 216. The damper platform 20 supports the damper plunger 18. The damper plunger 18, and more particularly, the plunger platform 21 separates the primary damper cavity 22 into a first primary damper cavity 24 and a second primary damper cavity 26 and forms a restrictive clearance 28 between the first primary damper cavity 24 and the second primary damper cavity 26. This critical clearance, and more particularly, the restrictive clearance 28 is incorporated to manage and control the bearing support fluid. As illustrated, the restrictive clearance 28 is oriented to provide for a restricted flow of fluid therethrough in a direction substantially perpendicular to the vibrational force 17 imposed on the damper assembly, and more particularly the central post 16.

In an embodiment, an unoccupied portion of the cavity 246 (FIG. 2) is filled with a non-compressible, viscous fluid and is hermetically sealed via a sealing plate (not shown). The fluid may be any non-compressible, viscous fluid suitable for the particular operating environment. For example, in some embodiments, the fluid may be an oil-based fluid, a liquid metal (broadly, a metallic fluid), or the like.

In the exemplary embodiment, the primary damper cavity 22, and more particularly, each of the first primary damper cavity 24 and the second primary damper cavity 26 are bounded by the structure of the damper platform 20, the plunger platform 21 of the plunger 18, each having a high stiffness coefficient (rigid), and the flexible element 14. Although shown as a single integrally formed component, in some embodiments the damper plunger 18 may be a multicomponent part. Providing the damper plunger 18 as a single integrally formed component facilitates a reduction in parts of the bearing 200, thereby further reducing the cost, complexity, size and weight of the bearing 200. Any suitable fabrication technique may be utilized to create the components of the bearing 200, for example such as the EDM or additive manufacturing techniques described above.

As previously described, the damper plunger 18 separates the primary damper cavity 22 into the first primary damper cavity 24 and the second primary damper cavity 26. The damper plunger 18 and the primary damper cavity 22 are dimensioned relative to one another to provide a predetermined clearance between the damper plunger 18 and a primary damper cavity wall 25, defined by the damper platform 20, to form the restrictive clearance 28 and thus the resistive flow path. The primary damper cavity restrictive clearance 28 is defined between an end 29 of the plunger platform 21 and the cavity wall 25 of the damper platform 20 to define the first primary damper cavity 24 and the second primary damper cavity 26.

In operation, when a force (e.g., a vibrational force 17 caused by rotation of a shaft) is applied to the bearing pad 208 (FIG. 2), a relative motion between the damper plunger 18 and the housing 216 (FIG. 2) occurs. Such a motion causes a fluid to be forced through the restrictive clearance 28 between the first primary damper cavity 24 and the second primary damper cavity 26, in a direction substantially perpendicular to the vibrational force 17. As the primary damper cavity 22 volumes are modulated through vibratory motion transferred from the central post 16, as illustrated by directional arrow 17, fluid flow is created and forced through the primary damper cavity restrictive clearance 28 generating viscous energy dissipation; the mechanism responsible for damping. Due to a dash-pot effect of the fluid (resistance to motion) an energy of the force is dissipated, thereby damping the force.

In contrast to known damper assemblies formed by additive manufacturing, the primary damper cavity restrictive clearance 28, and more particularly an annular orifice 30 that defines the damper cavity restrictive clearance 28, is elliptical in geometry, thereby assuring control over a critical orifice clearance and dimensional resolution. As previously stated, during additive manufacturing of a known HSFD, subsequent to the build layers reaching a 45-degree tangency line, the build quality is severely compromised resulting in "stalactite" formations due to unsupported build layers. For reference, the build direction during the additive manufacturing of the HSFD assembly 234 is illustrated in FIGS. 3 and 4 by directional arrow 32. The HSFD assembly 234 provides a solution to this build problem by focusing on the 45-degree tangency line where the build quality starts to become compromised. By forming the orifice 30 defining the primary damper cavity restrictive clearance 28 having an elliptical geometry it moves the 45-degree tangency line farther up the primary damper cavity restrictive clearance 28 towards the top-center of the orifice 30, thereby reducing the angular span where the build quality is compromised. With this modification to the geometry of the orifice 30 that defines the primary damper cavity restrictive clearance 28, the angular span where the clearance varies can be addressed through other build techniques using "gap-jumps" and the like. More specifically, the elliptical geometry brings the 45-degree tangency points together to a dimension that enables "gap-jump" methods to be employed.

FIG. 4 illustrates an enlarged portion of FIG. 3, illustrating a midplane 29 of the primary damper cavity restrictive clearance 28. As illustrated, at the mid-plane 29 the elliptical orifice 30 is defined having a major axis 34 and a minor axis 36. It should be noted the restrictive clearance, and more particularly the elliptical orifice 30 controlling the restrictive flow is in a single plane, and more particularly, illustrated at the mid-plane 29. Accordingly, the damper cavity restrictive clearance 28 is defined between the first primary damper cavity and the second primary damper cavity by an elliptical damper orifice 30 having its major-axis 34 and minor-axis 36 at the mid-plane 29 of the damper cavity restrictive clearance 28. As such, the elliptical damper orifice 30 is oriented perpendicular to a direction of the vibrational force imposed on the damper assembly and provides for the restrictive flow therethrough in a direction perpendicular to a direction of the vibrational force.

Figure 5:
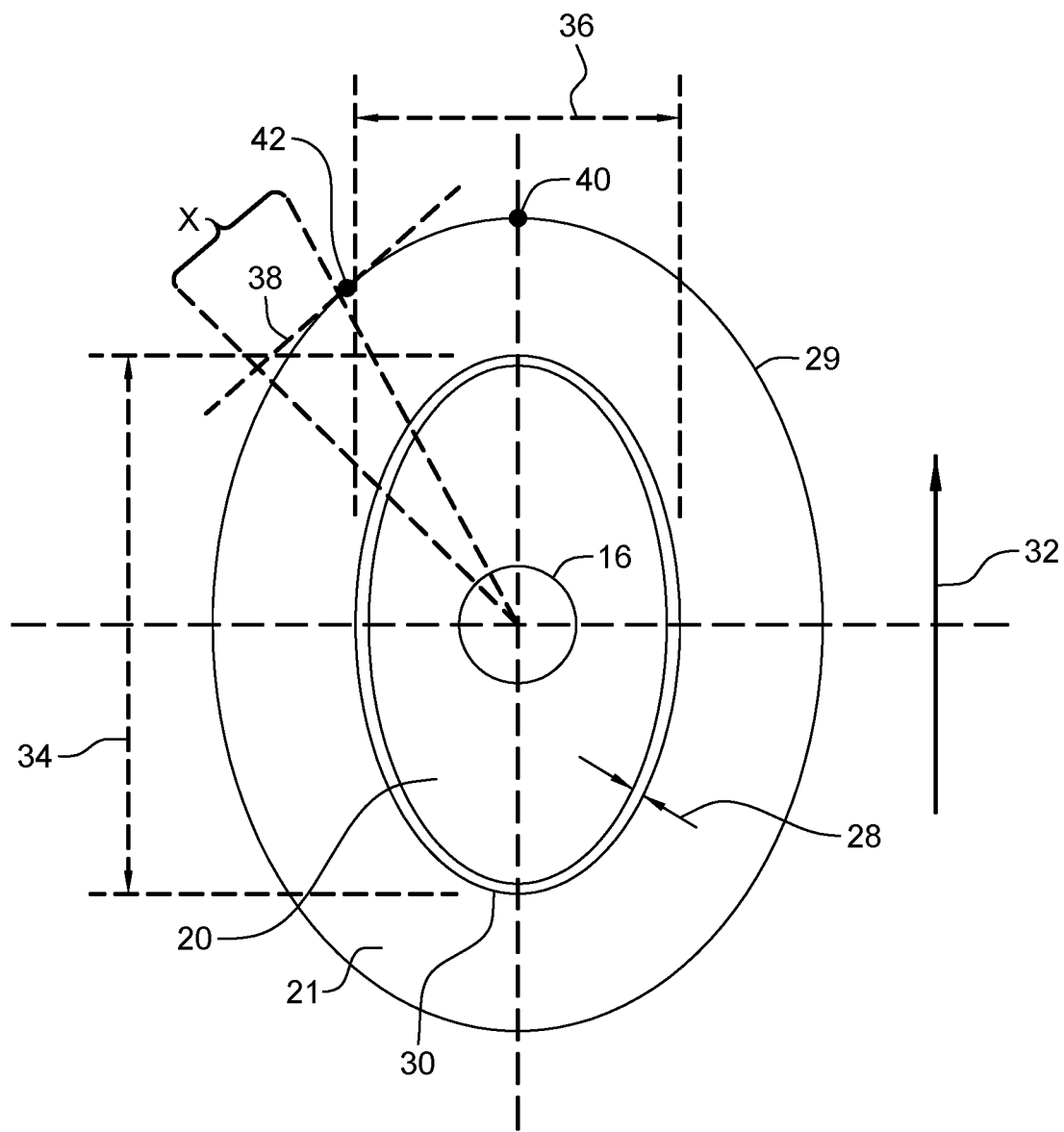
FIG. 5 is an enlarged schematic top view of an embodiment of an annular restrictive clearance in an HSFD taken through line 5-5 of FIG. 3, in accordance with one or more embodiments of the present disclosure.

Referring now to FIG. 5, illustrated is a simplified top view of a portion of the HSFD assembly 234, taken through line 5-5 of FIG. 3, illustrating the damper orifice 30 and the primary damper cavity restrictive clearance 28 at the mid-plane 29. As illustrated, a 45-degree tangential line 38, and more particularly a 45-degree tangential point 42, is moved a distance "x" closer to a vertex 40 of the elliptical orifice 30. During the additive manufacturing build process in the direction 32, moving the 45-degree tangential point 42 closer to the vertex 40 of the elliptical orifice 30 enables "gap-jump" methods of additive manufacturing to be employed. More particularly, gap jump methods can be employed with unsupported structures that are in close vicinity to one another. Gap jumps involve control of laser power and scan rates/paths to mitigate the stalactite formations which occur in normal build parameters with substantial unsupported surfaces. Using the elliptical annular clearance geometry disclosed herein, the clearance is controlled to a much higher degree beyond the conventional 45-degree tangency point for circular orifice restriction geometries.

The inventor has observed that the above bearing 200 may further allow the bearing 200 to be utilized in unconventional locations and/or integrations throughout a turbomachine without disrupting an existing cross section, length or architecture of the turbomachine. Such utilization of the inventive bearing 200 may advantageously benefit engine operation due to reduced clearance closures during maneuver of loads, ability to engineer loner rotor bearing systems with additional stages, reduction in dynamic bearing and structural loads, reduction in synchronous vibration response, and improved stability.

Figure 6:
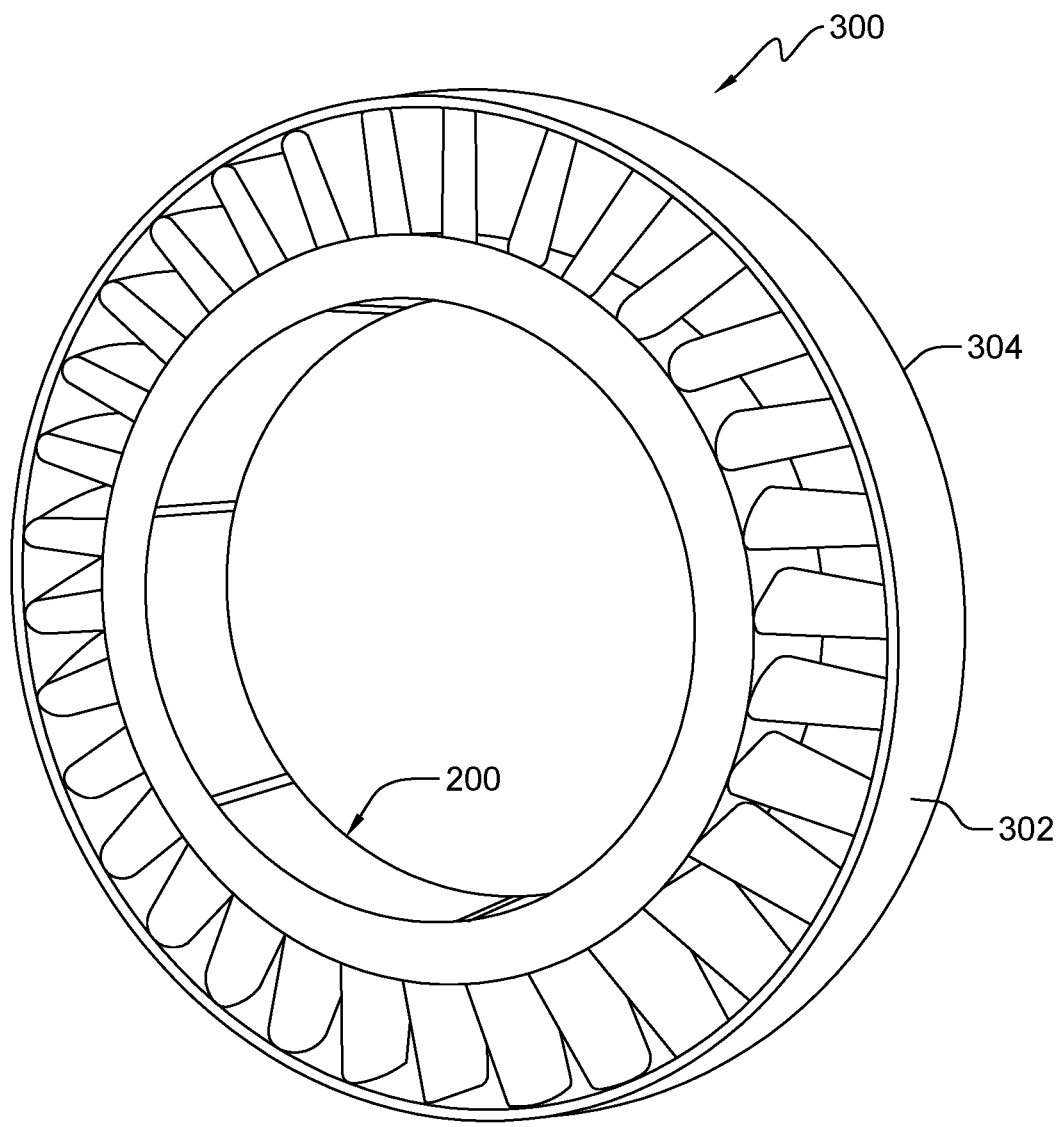
FIG. 6 is a simplified turbine nozzle including an exemplary gas bearing and HSFD, in accordance with one or more embodiments of the present disclosure.

For example, in some embodiments, the bearing 200 may be integrated into a turbine nozzle 300 of an aircraft engine, such as shown in FIG. 6. In such embodiments, guide vanes 302 of the nozzle 300 may be disposed between, and supported by, the housing 116 (FIG. 8) of the bearing 200 and an outer ring 304 of the turbine nozzle 300.

Thus, embodiments of a bearing including a hermetic squeeze film damper having an elliptical damper orifice has been provided herein. By using an elliptical damper orifice to form the restrictive clearance(s), the build layers are supported during additive manufacturing. The disclosed damper design provides improved clearance control over conventional circular geometry clearances. The elliptical damper orifice design further provides for the clearance to be controlled to a high precision. The novel bearing advantageously incorporates the HSFD assembly including the elliptical damper orifice.

Ranges disclosed herein are inclusive and combinable (e.g., ranges of "about 2 mils and about 100 mils", is inclusive of the endpoints and all intermediate values of the ranges of "about 2 mils and about 100 mils," etc.). "Combination" is inclusive of blends, mixtures, alloys, reaction products, and the like. Furthermore, the terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the state value and has the meaning dictated by context, (e.g., includes the degree of error associated with measurement of the particular quantity). The suffix "(s)" as used herein is intended to include both the singular and the plural of the term that it modifies, thereby including one or more of that term (e.g., the colorant(s) includes one or more colorants). Reference throughout the specification to "one embodiment", "some embodiments", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

This written description uses examples to disclose the invention, including the best mode, and to enable any person skilled in the art to practice the invention, including making and using any devices or systems and performing any incorporated methods. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims. Such other examples are intended to be within the scope of the claims if they include structural elements that do not differ from the literal language of the claims, or if they include equivalent structural elements with insubstantial differences from the literal languages of the claims.

What is claimed is:

1. A damper assembly of a bearing, comprising:
   a damper housing;
   a damper plunger disposed at least partially within the housing, wherein the damper plunger is movable within the housing to define a first primary damper cavity and a second primary damper cavity; and
   a damper cavity restrictive clearance defined between the first primary damper cavity and the second primary damper cavity, the damper cavity restrictive clearance including an elliptical damper orifice having a major-axis and a minor-axis at a mid-plane of the damper cavity restrictive clearance, the damper orifice oriented perpendicular to a direction of a vibrational force imposed on the damper assembly.

2. The damper assembly as claimed in claim 1, wherein the damper housing is a stationary annular damper housing.

3. The damper assembly as claimed in claim 1, further comprising a plurality of flexible elements coupled to the damper housing and responsive to damping and stiffness forces generated in the damper housing.

4. The damper assembly as claimed in claim 3, wherein the plurality of flexible elements are disposed substantially parallel to a moving central post configured to transmit an externally imposed vibration to the damper plunger, which then modulates the first primary damper cavity and the second primary damper cavity.

5. The damper assembly as claimed in claim 1, wherein the damper plunger comprises a damper platform defining the first primary damper cavity and the second primary damper cavity, and a plunger platform extending between the first primary damper cavity and the second primary damper cavity.

6. The damper assembly as claimed in claim 1, wherein each of the first primary damper cavity and the second primary damper cavity are bounded by a structure of the damper platform, the plunger platform of the plunger and the plurality of flexible elements.

7. The damper assembly as claimed in claim 1, wherein a 45-degree tangency line of the primary damper cavity restrictive clearance is formed proximate a vertex of the elliptical damper orifice.

8. The damper assembly as claimed in claim 1, wherein the bearing is integrated into a turbine nozzle of an aircraft engine.

9. The damper assembly as claimed in claim 1, wherein the bearing is a hermetic squeeze film damper.

10. A gas bearing, comprising:
    an outer rim;
    a housing; and
    a damper assembly, comprising:
       a damper housing;
       a damper plunger disposed at least partially within the housing, wherein the damper plunger is movable within the housing to define a first primary damper cavity and a second primary damper cavity; and
       a damper cavity restrictive clearance defined between the first primary damper cavity and the second primary damper cavity, the damper cavity restrictive clearance including an elliptical damper orifice, having a major-axis and a minor-axis at a mid-plane of the damper cavity restrictive clearance, oriented perpendicular to a direction of a vibrational force imposed on the damper assembly.

11. The damper assembly as claimed in claim 10, wherein the damper housing is a stationary annular damper housing.

12. The damper assembly as claimed in claim 10, further comprising a plurality of flexible elements coupled to the damper housing and responsive to damping and stiffness forces generated in the damper housing.

13. The damper assembly as claimed in claim 12, wherein the plurality of flexible elements are disposed substantially parallel to a moving central post configured to transmit an externally imposed vibration to the damper plunger, which then modulates the first primary damper cavity and the second primary damper cavity.

14. The damper assembly as claimed in claim 10, wherein the damper plunger comprises a damper platform defining the first primary damper cavity and the second primary damper cavity, and a plunger platform extending between the first primary damper cavity and the second primary damper cavity.

15. The damper assembly as claimed in claim 10, wherein each of the first primary damper cavity and the second primary damper cavity are bounded by a structure of the damper platform, the plunger platform of the plunger and the plurality of flexible elements.

16. The damper assembly as claimed in claim 10, wherein a 45-degree tangency line of the primary damper cavity restrictive clearance is formed at a top-center of the elliptical damper orifice.

17. The damper assembly as claimed in claim 10, wherein the bearing is integrated into a turbine nozzle of an aircraft engine.

18. The damper assembly as claimed in claim 10, wherein the bearing is a hermetic squeeze film damper.

19. The damper assembly as claimed in claim 10, wherein the damper assembly is a hermetic squeeze film damper integrated into a turbine nozzle of an aircraft engine.

20. A gas bearing, comprising:
an outer rim;
a housing; and
a damper assembly, comprising:
   a damper housing;
   a damper plunger disposed at least partially within the housing, wherein the damper plunger is movable within the housing to define a first primary damper cavity and a second primary damper cavity; and
a damper cavity restrictive clearance defined between the first primary damper cavity and the second primary damper cavity, the damper cavity restrictive clearance including an elliptical damper orifice, having a major-axis and a minor-axis at a mid-plane of the damper cavity restrictive clearance, oriented perpendicular to a direction of a vibrational force imposed on the damper assembly, wherein a 45-degree tangency line of the primary damper cavity restrictive clearance is formed at a top-center of the elliptical damper orifice.

* * * * *